(12) United States Patent
Alneri et al.

(10) Patent No.: US 12,491,824 B2
(45) Date of Patent: Dec. 9, 2025

(54) MOTOR VEHICLE WITH IMPROVED WHEEL ARCH TRIMS

(71) Applicant: FERRARI S.P.A., Modena (IT)

(72) Inventors: Stefano Alneri, Modena (IT); Ivan Moranzoni, Modena (IT)

(73) Assignee: FERRARI S.P.A., Modena (IT)

( * ) Notice: Subject to any disclaimer, the term of this patent is extended or adjusted under 35 U.S.C. 154(b) by 419 days.

(21) Appl. No.: 18/342,288

(22) Filed: Jun. 27, 2023

(65) Prior Publication Data

US 2024/0001867 A1     Jan. 4, 2024

(30) Foreign Application Priority Data

Jul. 1, 2022   (IT) .................. 102022000013945

(51) Int. Cl.
   *B60R 13/04*   (2006.01)
   *B60R 19/02*   (2006.01)
   *B62D 35/00*   (2006.01)

(52) U.S. Cl.
   CPC ............ *B60R 13/04* (2013.01); *B60R 19/023* (2013.01); *B62D 35/00* (2013.01)

(58) Field of Classification Search
   CPC ..... B60R 13/04; B60R 19/023; B62D 25/161; B62D 25/18; B62D 35/00; B62D 35/008
   See application file for complete search history.

(56) References Cited

U.S. PATENT DOCUMENTS

| 9,994,266 B1 | 6/2018 | Del Gaizo et al. |
| 2004/0135362 A1* | 7/2004 | Banry ............... B29C 45/14336 280/847 |
| 2010/0156142 A1* | 6/2010 | Sumitani ............... B62D 37/02 296/180.1 |

(Continued)

FOREIGN PATENT DOCUMENTS

| DE | 102016000382 A1 | 7/2016 |
| DE | 102016004054 A1 * | 4/2017 ............. B62D 25/18 |

(Continued)

OTHER PUBLICATIONS

Italian Search Report for Application No. 102022000013945; Filing Date: Jul. 1, 2022; Date of Mailing—Feb. 17, 2023, 6 pages.

*Primary Examiner* — Lori Lyjak
(74) *Attorney, Agent, or Firm* — CANTOR COLBURN LLP

(57) ABSTRACT

Motor vehicle presenting a median longitudinal axis, parallel to the straight direction of travel, and comprising a plurality of wheels, a bodywork having two opposite sidewalls defining a respective wheel compartment for each wheel, bounded by a respective wheel arch, and, for each wheel compartment, a wheel arch trim disposed at the respective wheel arch. Each wheel arch trim comprises a first arch-shaped portion, disposed within the volume defined by the bodywork and attached to a body shell of the motor vehicle, a second arch-shaped portion, protruding externally from the bodywork with respect to the relative wheel arch, and a airflow channeling formed at least par- (Continued)

tially on the second arch-shaped portion to create an air blade tangent to the outer sidewall of the respective wheel and to the area of the respective sidewall adjacent to the respective wheel arch.

10 Claims, 7 Drawing Sheets

(56) References Cited

U.S. PATENT DOCUMENTS

| | | | | |
|---|---|---|---|---|
| 2010/0213737 A1* | 8/2010 | Hirano | ................. | B62D 35/008 |
| | | | | 296/181.5 |
| 2011/0001334 A1* | 1/2011 | Hirano | ................... | B62D 35/00 |
| | | | | 296/180.1 |
| 2018/0050731 A1* | 2/2018 | Job | ...................... | B62D 25/161 |
| 2018/0326923 A1* | 11/2018 | Königbauer | ........ | B60R 13/0861 |

FOREIGN PATENT DOCUMENTS

| | | | | | |
|---|---|---|---|---|---|
| FR | 3059974 | B1 * | 1/2019 | ........... | B62D 25/161 |
| GB | 2076762 | A * | 12/1981 | ........... | B62D 25/161 |
| WO | 2018104604 | A1 | 6/2018 | | |

* cited by examiner

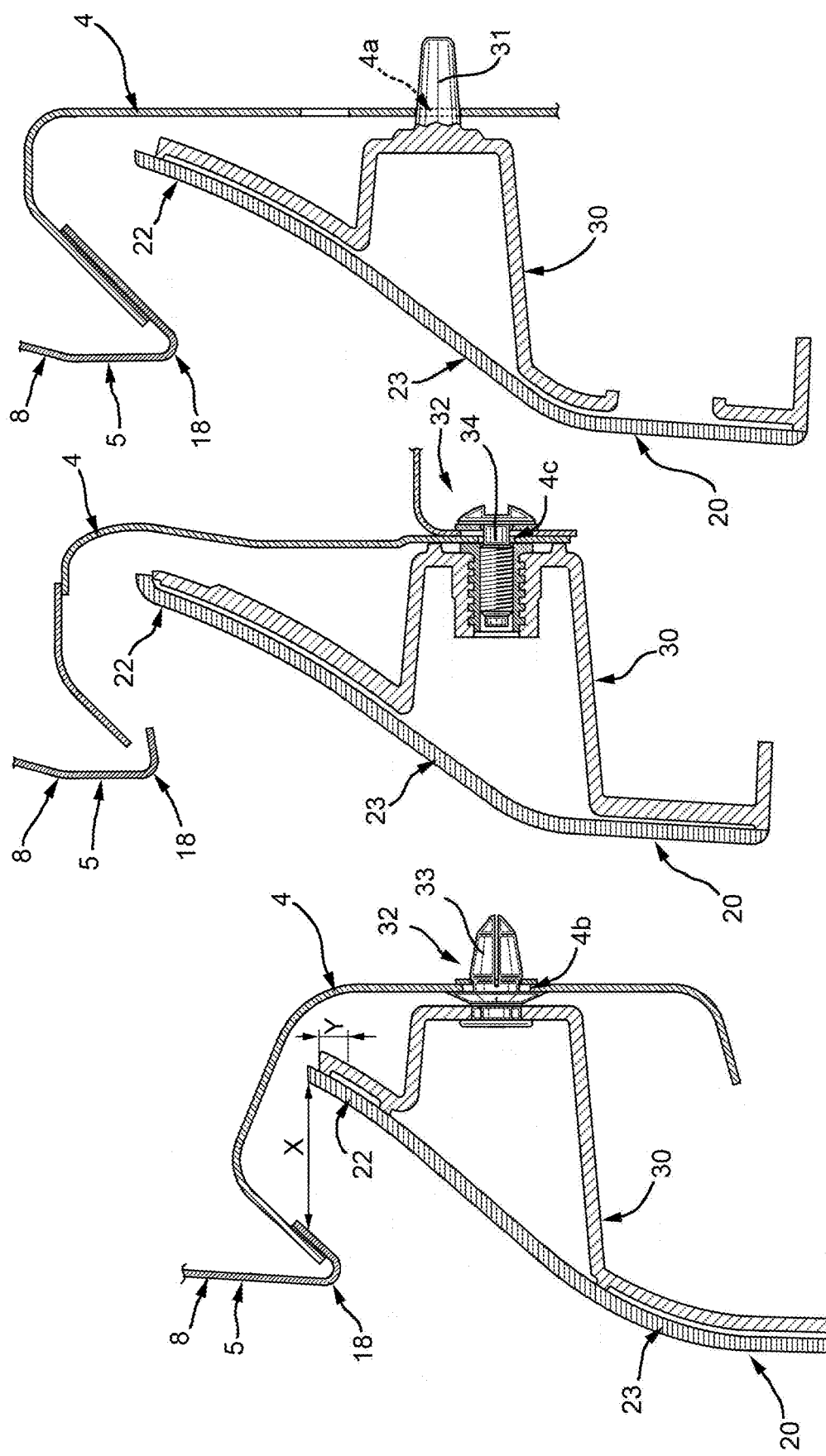

MOTOR VEHICLE WITH IMPROVED WHEEL ARCH TRIMS

CROSS-REFERENCE TO RELATED APPLICATIONS

This patent application claims priority from Italian patent application no. 102022000013945 filed on Jul. 1, 2022, the entire disclosure of which is incorporated herein by reference.

TECHNICAL FIELD

The present invention relates to a motor vehicle provided with wheel arch trims of improved type. In particular, the description below will refer explicitly to four-wheeled motor vehicles, however without loss of generality.

BACKGROUND ART

There are known motor vehicles, and in particular motor cars, with two front wheels and two rear wheels and comprising a body shell or chassis, a bodywork, applied to the body shell or integrated with the body shell itself (load-bearing bodywork), and passenger compartment, obtained inside the bodywork between the front wheels and the rear wheels.

In the area of each wheel, the bodywork and the body shell form a respective wheel compartment, bounded above and laterally by a respective wheel arch; in practice, the wheel arch covers the wheel, but so as to allow its vertical movement caused by holes and stones, and, in the case of the front wheels, it must have a width such as to make steering possible.

In motor vehicles of SUV (Sport Utility Vehicles) or Crossover type, or in general suitable to be used as off-road vehicle, wheel arch trims, generally made of plastic material, are fitted externally on the respective wheel arches in order to protect the painted sheet metal parts from damage caused by possible impact with chippings and/o gravel during travel over dirt roads.

An important aspect to be considered in wheel arch trims of known type is their lateral protrusion with respect to the sidewalls of the bodywork on which they are fitted; this protrusion must in fact be minimized to avoid overly penalizing the aerodynamics of the motor vehicle, creating an increase in the aerodynamic drag in an area in which there is already a turbulent slipstream deriving from the presence and rotation of the wheel rim, with its permeability, and from the outer shoulder of the tire mounted on the rim itself.

DESCRIPTION OF THE INVENTION

The object of the present invention is to produce a motor vehicle, which is provided with wheel arch trims that not only allow parts of the adjacent bodywork to be protected from possible damages caused by impacts of gravel and chippings during travel, but also a significant improvement in management of the slipstream of the wheels with reduction or elimination of the turbulences produced thereby.

According to the present invention, there is produced a motor vehicle as claimed in claim 1 and in the claims dependent thereon.

BRIEF DESCRIPTION OF THE DRAWINGS

The present invention shall now be described with reference to the accompanying drawings, which show an example of non-limiting embodiment thereof, wherein:

FIG. 5 is a section along the line V-V of FIG. 2;

FIG. 6 is a section along the line VI-VI of FIG. 2;

FIG. 7 is a section along the line VII-VII of FIG. 2;

PREFERRED EMBODIMENTS OF THE INVENTION

Figure 1:
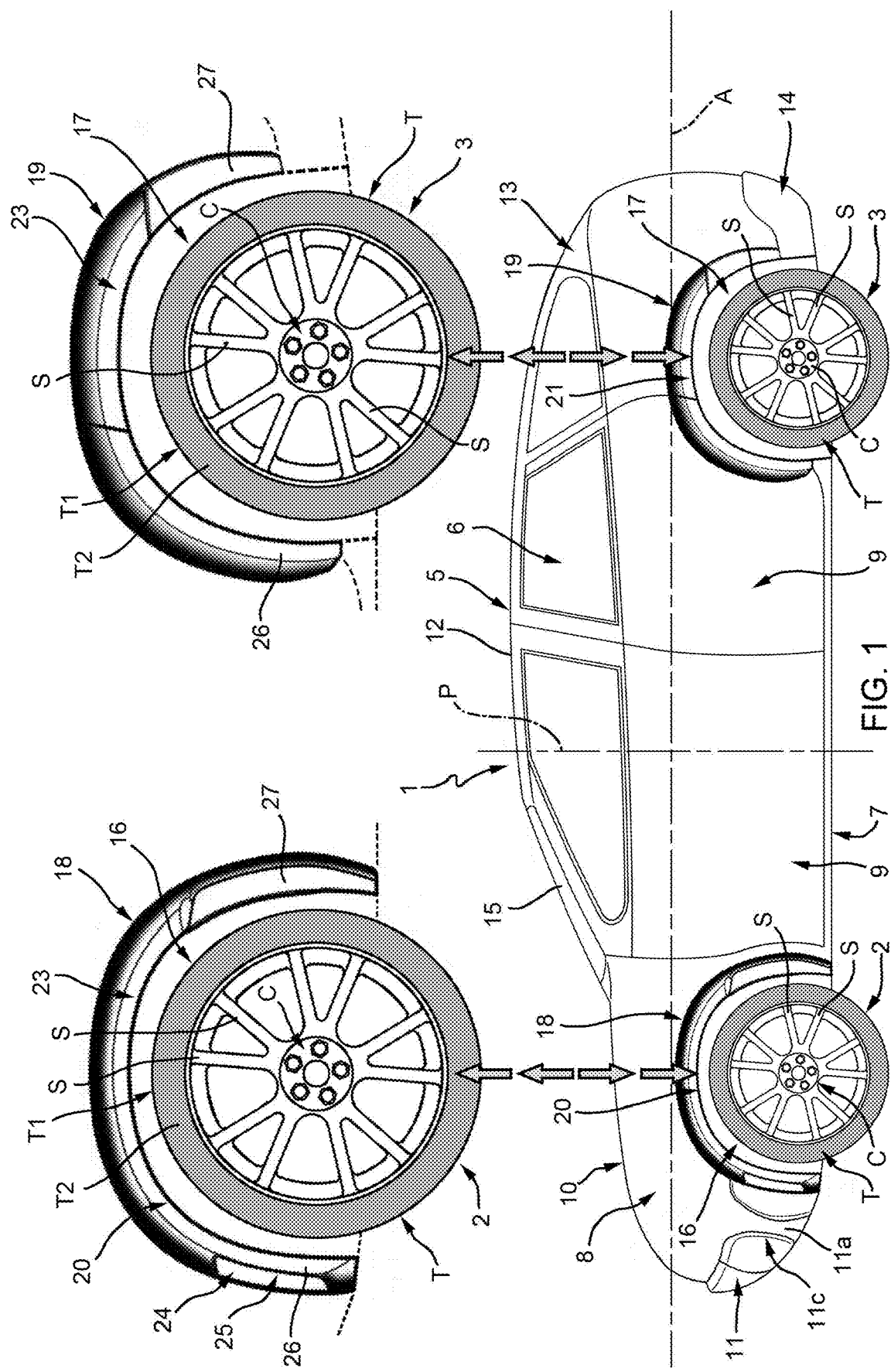
FIG. 1 is a side view, with parts removed for clarity, of a motor vehicle produced according to the dictates of the present invention and in which the areas of the front and rear wheels are enlarged to highlight the wheel arch trims used.
Figure 2:
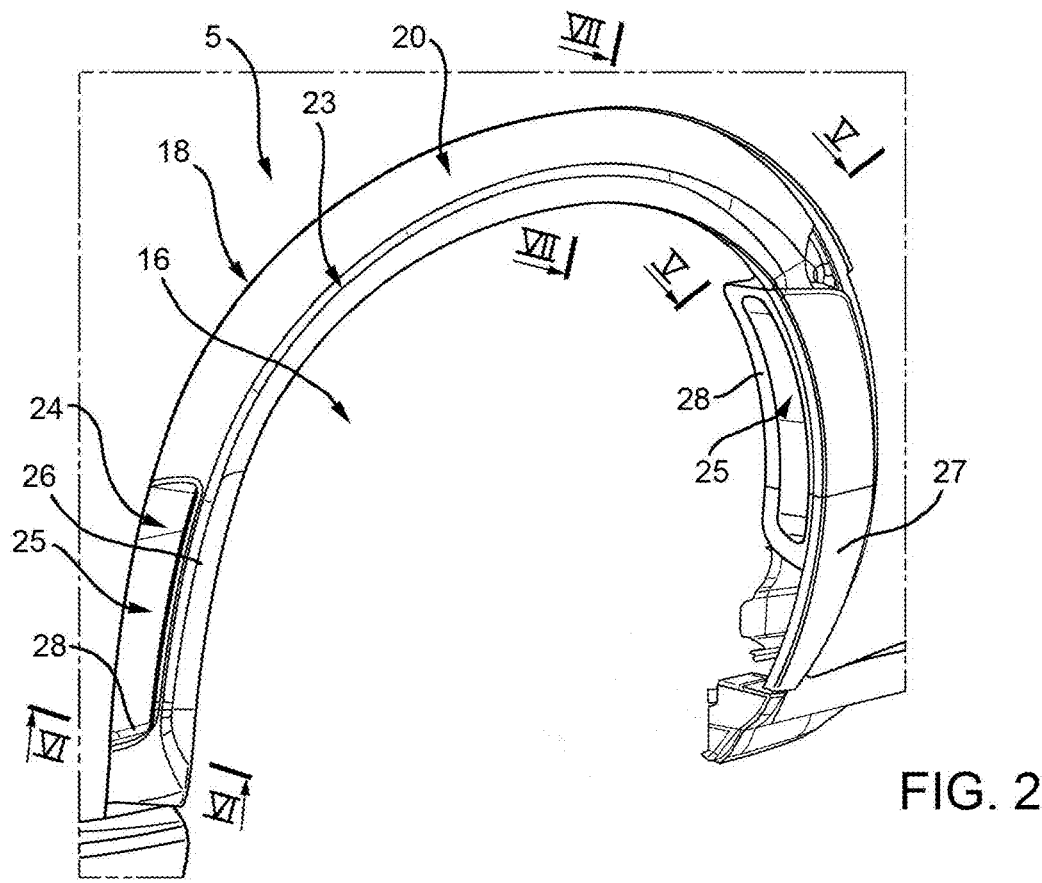
FIG. 2 is a side view in enlarged scale of the front wheel arch trim of FIG. 1 applied on the relevant motor vehicle.
Figure 9:
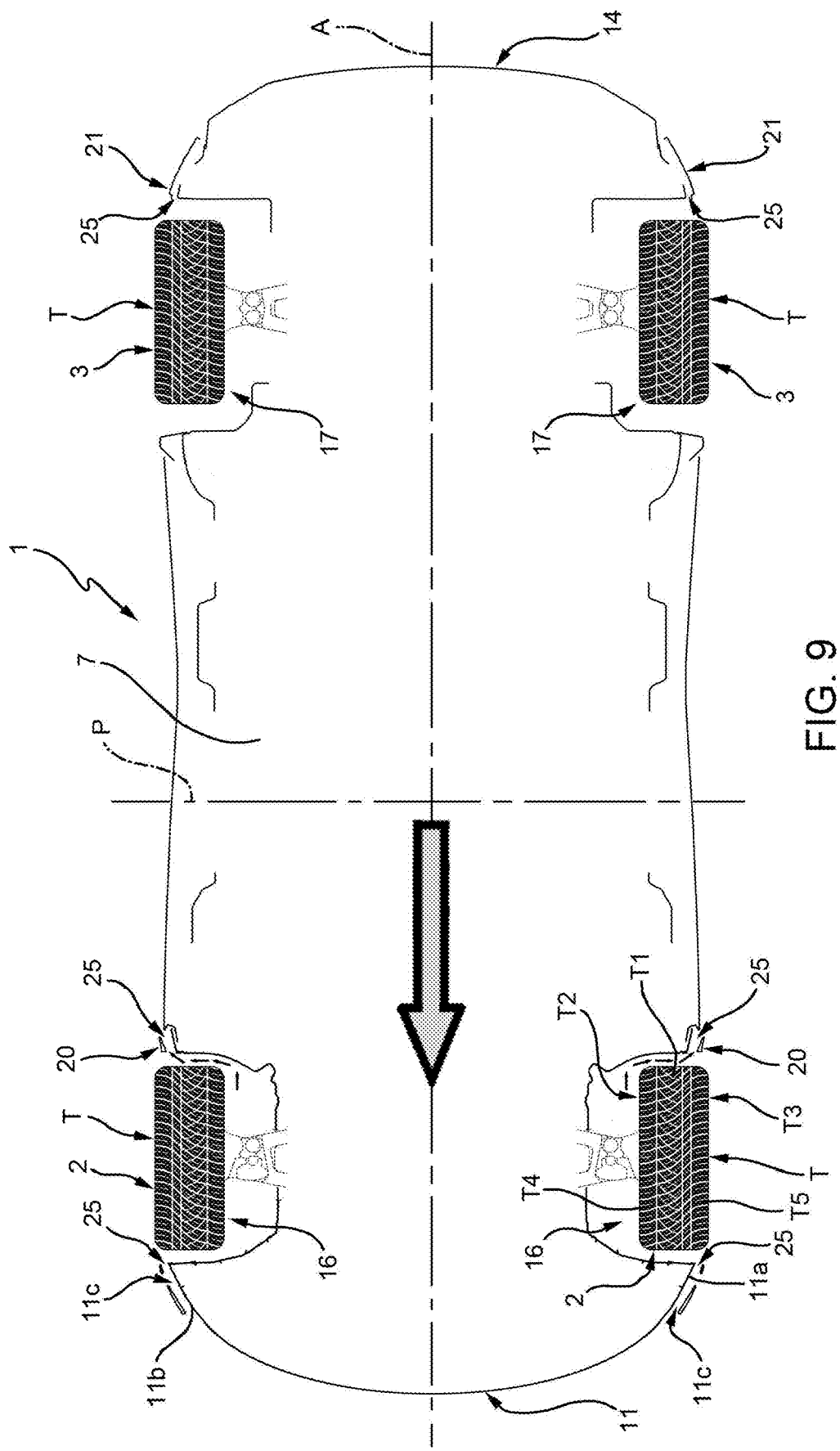
FIG. 9 is a bottom view of the motor vehicle of FIG. 1.

FIGS. 1 and 9 indicate as a whole with 1 a motor vehicle, in particular a motor car, presenting two front wheels 2 and two rear wheels 3 and comprising a chassis or body shell 4 (partially visible in FIGS. 5, 6 and 7), a bodywork 5, applied to the body shell 4 or integrated with the body shell 4 itself, and a passenger compartment 6, obtained inside the bodywork 5 between the wheels 2 and the wheels 3 themselves.

Figure 10:
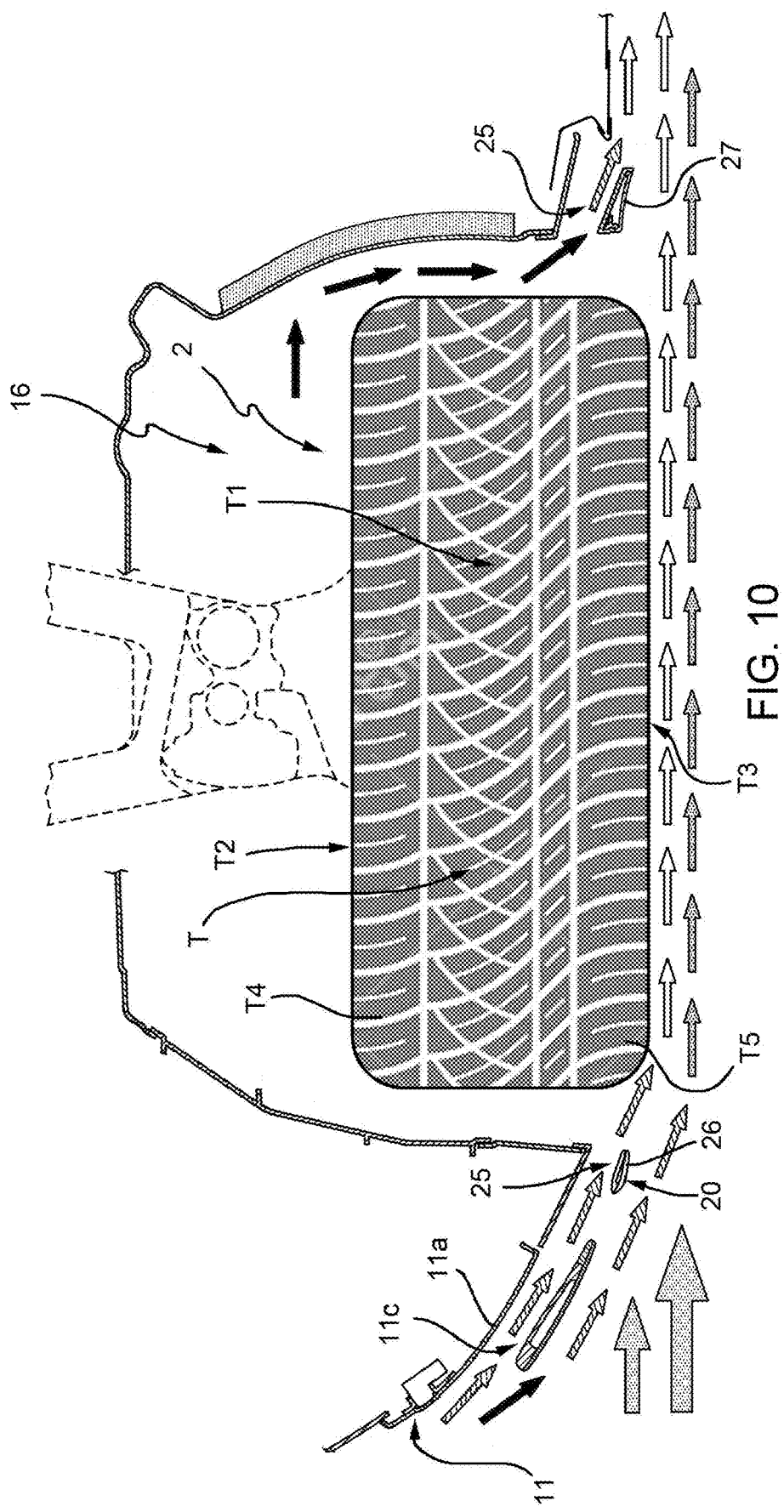
FIG. 10 is a bottom view on an enlarged scale of the area of a front wheel of the motor vehicle of FIGS. 1 and 9, with indication of the trend of the slipstream during travel.

As can be seen in FIGS. 1, 9 and 10, each wheel 2, 3 comprises a rim C, provided with spokes S, and a tire T surrounding the rim C itself and including a tread T1 and respective opposite sidewalls T2, T3, one of which (T2) facing the inside of respective wheel compartment 16, 17 in use and the other (T3) facing outward; with particular reference to FIGS. 9 and 10, the tread T1 of each wheel 2, 3 is bounded towards the opposite sidewalls T2, T3 by respective rounded circumferential edges T4, T5, facing the inside of the related wheel compartment 16, 17 and outward, respectively.

In the example illustrated (FIGS. 5, 6, 7), the body shell 4 is disposed within the bodywork 5 and comprises, in a known manner, a flatbed 7 and a series of longitudinal members and uprights to which the bodywork 5 itself and the other components of the motor vehicle 1 are attached.

In the case of bearing bodywork, the flatbed 7 is directly part thereof just as the body shell is integrated in the bodywork itself.

In particular, the bodywork 5 defines the external contour of the motor vehicle 1 and comprises:

- two opposite sidewalls 8, provided, in the case illustrated, with front and rear doors 9;
- a front hood 10;
- a front bumper 11;
- a roof 12;
- a rear trunk 13; and
- a rear bumper 14.

The motor vehicle 1 further comprises a windshield 15, extending between the front hood 10 and the roof 11, and a rear window (known per se), facing the windshield 15 and not visible in the accompanying figures.

The sidewalls 8 are disposed symmetrically on opposite sides of a median longitudinal axis A of the motor vehicle 1, parallel to the straight direction of travel and orthogonal to a median transverse vertical plane P of the motor vehicle 1 itself. The sidewalls 8 bound the motor vehicle 1 laterally outwardly and are, in practice, disposed facing each other and parallel to the axis A.

The passenger compartment 6 is bound at the front by the windshield 12, at the rear by the rear window and laterally by the doors 9 and in part by the sidewalls 8.

The motor vehicle 1 could also comprise, on each sidewall 8, a single door 9.

With reference to FIGS. 1-3, 5-7 and 9-10, the sidewalls 8 define, together with the flatbed 7, a respective front and rear wheel compartment 16, 17 for each front and rear wheel 2, 3; the wheel compartments 16 are bound by respective front and rear wheel arches 18, 19.

Moreover, as can be seen in the accompanying figures, for each wheel compartment 16, 17 a respective front and rear wheel arch trim 20, 21, disposed at the respective wheel arch 18, 19, is present.

Advantageously, each wheel arch trim 20, 21 comprises:
- a first arch-shaped portion 22 disposed within the volume defined by the bodywork 5, facing, at least in part and from inside the bodywork 5 itself, the respective wheel arch 18, 19 and fastened to a part of the body shell 4;
- a second arch-shaped portion 23 protruding externally from the bodywork 5 with respect to respective wheel arch 18, 19; and
- an airflow channeling 24 formed at least partially on the arch-shaped portion 23 to create an air blade (FIG. 10) tangent to the outer sidewall of the respective wheel 2, 3 and to the area of the respective sidewall 8 adjacent to the respective wheel arch 18, 19.

In particular, as illustrated in FIG. 5, the distance, in a direction horizontal and orthogonal to the axis A, between the free curvilinear edge of the arch-shaped portion 22 of each wheel arch trim 20, 21 and the bodywork 5 adjacent to the respective wheel arch 18, 19 is indicated with X and is always greater than zero. The function of the distance X will be clarified below.

Instead, the distance, in a vertical direction and orthogonal to the axis A and to the distance X, between the free curvilinear end edge of the arch-shaped portion 22 of each wheel arch trim 20, 21 and the curvilinear lower end edge of the respective wheel arch 18, 19 is indicated with Y and is always greater than zero; this means that the aforesaid free curvilinear end edge of the arch-shaped portion 22 of each wheel arch trim 18, 19 is always placed higher with respect to the lower curvilinear end edge of the respective wheel arch 18, 19.

With reference to FIGS. 1, 2, 4, 9 and 10, in the case of each front wheel arch trim 20, the channeling 24 comprises two through openings 25 obtained on a front end portion 26 and on a rear end portion 27 of the arch-shaped portion 23 of the wheel arch trim 20 itself.

Both the openings 25 have respective passage sections transverse to the axis A.

In more detail, the openings 25 have respective bounding edges 28 extending around respective axes of the openings 25 themselves, transverse to the median plane P and converging frontally towards the axis A.

As can be seen in particular in FIGS. 9 and 10, the openings 25 of each front wheel arch trim 20 are facing the outer edge T5 of the tread T1 of the tire T of the respective wheel 2, during the straight travel of the motor vehicle 1.

In the example illustrated in FIGS. 1, 9 and 10, the front bumper 11 has, at its own opposite lateral end portions 11a, 11b, respective through windows 11c facing the openings 25 obtained on the front portions 26 of the front wheel arch trims 20 to create, during the straight travel of the motor vehicle 1, airflow channeling along the respective sidewalls 8.

Preferably, with reference to FIGS. 2, 4, 5, 6 and 7, each front wheel arch trim 20 is attached to a part of the body shell 4 by the interposition of a respective skeleton element 30, which is also arch-shaped. In particular, each wheel arch trim 20 is coupled and/or glued to the respective skeleton element 30 so as to completely cover it outwardly.

FIGS. 5 to 7 illustrate the way in which each skeleton element 30 is attached to the body shell 4. In particular, centering elements 31 are used, such as centering pins obtained in one piece on each skeleton element 30, and releasable restraining elements 32, such as snap-lock pins 33 and metric screws 34; the centering elements 31 and the restraining elements 32 releasably engage respective holes 4a, 4b, 4c obtained on the body shell 4.

The centering elements 31 represent the first points in which each wheel arch trim 20 interfaces with the body shell 4 and this in fact takes place at the holes 4a; the function of the centering elements 31 is to guarantee correct positioning of each wheel arch trim 20 without an actual visual check by the operator. The snap-lock pins 33 are used to locally retain each front wheel arch trim 20 on the body shell 4 and guarantee correct and sturdy pre-assembly before clamping of the metric screws 34, which guarantee the stability of assembly over time.

During assembly of each skeleton element 30, the centering elements 31 are first engaged in the respective holes 4a of the body shell 4; at this point, by pressing firmly, the pins 33 are snapped into the holes 4b so as to obtain pre-assembly of the skeleton element 30 on the body shell 4; the last operation is clamping of the metric screws 34 in the respective threaded holes 4c.

The distances X defined above and illustrated in FIG. 5 must be such as to allow minimum translation of each skeleton element 30 to allow assembly thereof on the body shell 4; the same applies for the subsequent assembly of each wheel arch trim 20 on the respective skeleton element 30.

Figure 3:
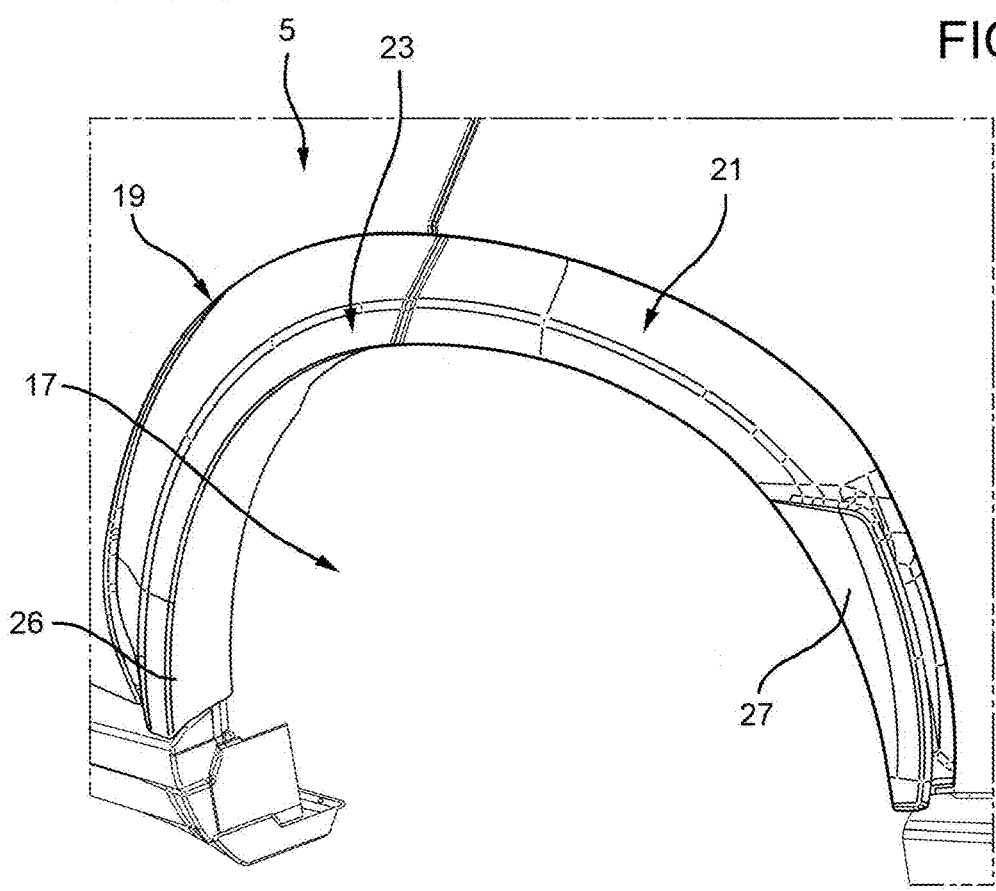
FIG. 3 is a side view in enlarged scale of the rear wheel arch trim of FIG. 1 applied on the relevant motor vehicle.
Figure 4:
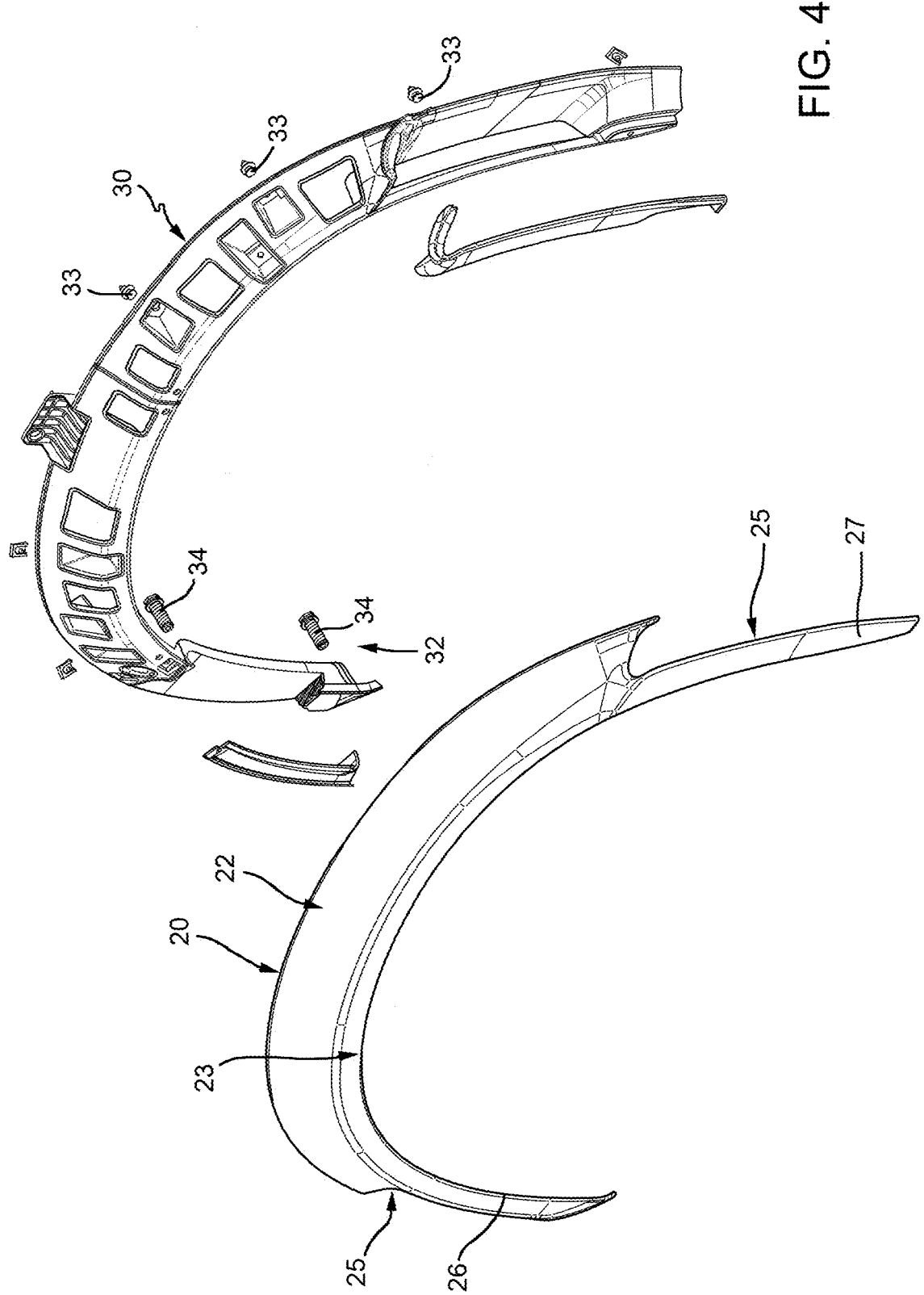
FIG. 4 is an exploded perspective view of the components of the front wheel arch trim of FIG. 2.

The rear wheel arch trims 21, illustrated essentially in FIGS. 3 and 8, have a structure and shape very similar to those of the front wheel arch trims 20 and therefore only the parts that differ therefrom will be described below; the same or equivalent parts of the front and rear wheel arch trims 20, 21 will be identified below with the same reference numbers.

In particular, each rear wheel arch trim 21 differs with respect to the front wheel arch trims 20 essentially in that they do not have the opening 25 on the front portion 26 and in that they are formed by several components, in the case illustrated two, assembled together and each forming a curvilinear section, in the case illustrated approximately one half, of the total arch profile.

Figure 8:
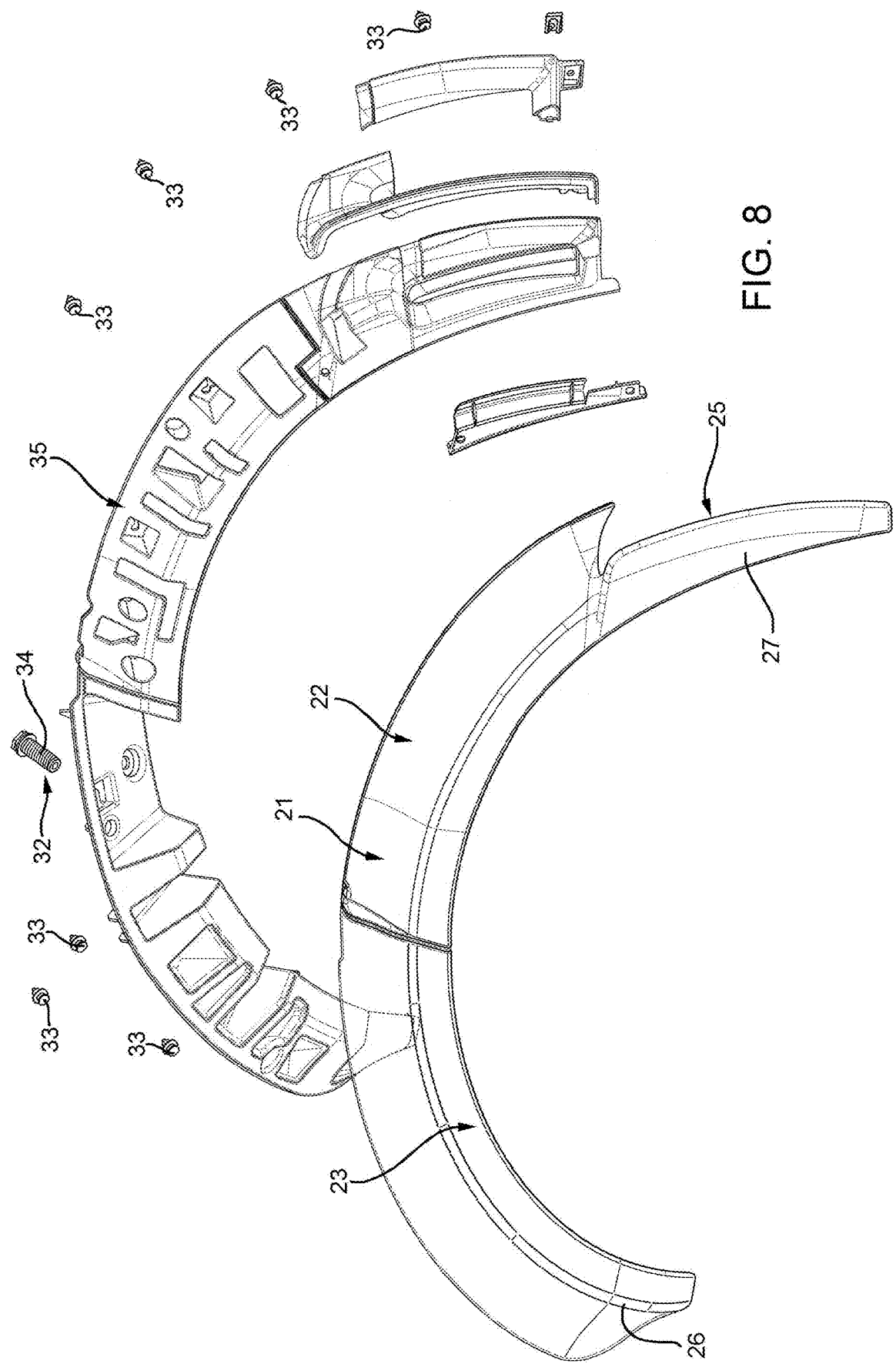
FIG. 8 is an exploded perspective view of the components of the rear wheel arch trim of FIG. 3.

As can be seen in FIG. 8, also the rear wheel arch trims 21 are attached to a part of the body shell 4 by the interposition of respective skeleton elements 35 also arched shaped and identical to the skeleton elements 30.

In particular, also in this case, each wheel arch trim 21 is coupled and/or glued to the respective skeleton element 31 so as to completely cover it outwardly.

The manner in which each skeleton element 35 is attached to the body shell 4 is identical to that used for the skeleton elements 30, i.e., through centering elements 31 and restraining elements 32 identical to those described above, i.e., snap-lock pins 33 and metric screws 34. This method is therefore not further described and the description above should be referred to.

In use, during the straight forward travel of the motor vehicle 1, the air is channeled at the two sides of the front bumper 11 from the windows 11c toward the two sidewalls 8.

The windows 11c act in synergy with the openings 25 of the two front wheel arch trims 20 to create a powerful air blade that aerodynamically seals the front wheels 2 preventing the release of turbulence in transverse direction to the axis A (FIGS. 9 and 10).

In the rear part of the front wheel arch trims 20, the further openings 25 allow the extraction of air from inside the wheel compartments 16 to be maximized so as to ensure the correct direction of the flow coming from the front area along the respective sidewalls 8, to which it adheres (FIG. 10).

The particular solution of the rear wheel arch trims 21 allows a powerful extraction of air from the rear wheel compartments 17 through the openings 25; moreover, the surfaces of the arch-shaped portions 22 of the aforesaid wheel arch trims 21 are elongated and contoured so as to be able to manage the rear points of separation of the airflows that flow around the sidewalls 8 and the wheels 2, 3.

By examining the features of the motor vehicle 1 produced according to the present invention the advantages that can be obtained therewith are evident.

In particular, the solution described of the wheel arch trims 20, 21 makes it possible to obtain a significant improvement in management of the slipstream of the wheels 2, 3 and consequently elimination of the turbulences produced by the presence and by the rotation of the rims C, and, ultimately, a clean and uniform air flow along the sides of the wheels 2, 3 themselves.

In practice, this type of result was obtained by positioning the wheel arch trims 20, 21 partly under the bodywork 5, so as to minimize the protrusion of the wheel arch trims 20, 21 themselves with respect to the bodywork 5, at the same time minimizing aerodynamic drag; positioning of the wheel arch trims 20, 21 under bodywork 5 produces a "floating" effect, i.e., it gives the impression of a vehicle body "resting" on the wheel arch trims 20, 21 themselves (details of FIG. 1).

Moreover, by entrusting attachment on the body shell 4 to the skeleton elements 30, 35, the wheel arch trims 20, 21 can perform solely the aerodynamic function described above and also an aesthetic function; consequently this allows greater flexibility with regard to the material used, for example plastic or composite materials, and/or the surface coating applied to the wheel arch trims 20, 21, for example embossed or painted finishes.

Finally, it is evident that modifications and variations can be made to the motor vehicle 1 described and illustrated without departing from the scope of protection defined by the appended claims.

The invention claimed is:

1. Motor vehicle (1) presenting a median longitudinal axis (A), parallel to the straight direction of travel, and comprising:
    a plurality of wheels (2, 3);
    a bodywork (5) defining the external contour of the motor vehicle (1) and having two opposite sidewalls (8) defining a respective wheel compartment (16, 17) for each wheel (2, 3), bounded by a respective wheel arch (18, 19); and
    for each wheel compartment (16, 17), a wheel arch trim (20, 21) disposed at the respective wheel arch (18, 19); characterized in that each wheel arch trim (20, 21) comprises:
    a first arch-shaped portion (22) disposed within the volume defined by said bodywork (5), facing, at least in part and from inside the bodywork (5) itself, the respective wheel arch (18, 19) and attached to a structural part (4) of said motor vehicle (1), internal with respect to said bodywork (5);
    a second arch-shaped portion (23) protruding externally from said bodywork (5) relative to said wheel arch (18, 19); and
    an airflow channeling (24) formed at least partially on said second arch-shaped portion (23) to create an air blade tangent to the outer sidewall of the respective wheel (2, 3) and to the area of the respective sidewall (8) adjacent to the respective wheel arch (18, 19).

2. Motor vehicle according to claim 1, wherein said channeling (24) comprises one or more through openings (25) obtained on at least one front end portion (26) and/or one rear end portion (27) of said second arch-shaped portion (23) of said wheel arch trim (18, 19).

3. Motor vehicle according to claim 2, wherein said opening (25) or openings (25) has/have a passage section or respective passage sections transverse to said longitudinal axis (A).

4. Motor vehicle according to claim 1, wherein each wheel (2, 3) is provided with a tire (T), and wherein said opening (25) or said openings (25) of each wheel arch trim (20, 21) is/are facing an outer circumferential edge (15) of a tread (T1) of the tire (T) of the respective wheel (2, 3), during the straight travel of said motor vehicle (1).

5. Motor vehicle according to claim 1, wherein each of said wheel arch trims (20, 21) is attached to said structural part (4) of said motor vehicle (1) by the interposition of a respective skeleton element (30, 35), which is also arch-shaped.

6. Motor vehicle according to claim 5, wherein each wheel arch trim (20, 21) is coupled and/or glued to the respective skeleton element (30, 35) so as to completely cover it outwardly.

7. Motor vehicle according to claim 5, wherein each said skeleton element (30, 35) is attached to said structural part (4) by means of releasable centering elements (31) and releasable restraining elements (32).

8. Motor vehicle according to claim 2, further comprising a front bumper (11) and in which said front bumper (11) has, at its own opposite end portions (11a, 11b), respective through windows (11c) facing the openings (25) formed on the front end portions (26) of the wheel arch trims (20) of the respective front wheels (2) of the motor vehicle (1) itself to facilitate the air channeling along the respective sidewalls (8) during the straight travel of the motor vehicle (1) itself.

9. Motor vehicle according to claim 1, wherein said structural part is a body shell (4) of the motor vehicle (1) on which said bodywork (5) is applied.

10. Motor vehicle according to claim 1, wherein each said wheel arch trim (20, 21) may be formed from a single component or from several components assembled together, each forming a curvilinear section of the arch profile.

* * * * *